(12) United States Patent
Kane

(10) Patent No.: US 11,926,980 B2
(45) Date of Patent: Mar. 12, 2024

(54) METHOD AND APPARATUS FOR A ROTATIONAL FENDER SYSTEM

(71) Applicant: David Kane, Sequim, WA (US)

(72) Inventor: David Kane, Sequim, WA (US)

( * ) Notice: Subject to any disclaimer, the term of this patent is extended or adjusted under 35 U.S.C. 154(b) by 447 days.

(21) Appl. No.: 17/320,830

(22) Filed: May 14, 2021

(65) Prior Publication Data
US 2021/0355646 A1 Nov. 18, 2021

Related U.S. Application Data

(60) Provisional application No. 63/025,016, filed on May 14, 2020.

(51) Int. Cl.
*E02B 3/26* (2006.01)
*B63B 59/02* (2006.01)
*E02B 3/28* (2006.01)

(52) U.S. Cl.
CPC ............... *E02B 3/26* (2013.01); *B63B 59/02* (2013.01); *E02B 3/28* (2013.01)

(58) Field of Classification Search
CPC . B63B 59/00; B63B 59/02; E02B 3/00; E02B 3/26; E02B 3/28
USPC ........................................................ 114/220
See application file for complete search history.

(56) References Cited

U.S. PATENT DOCUMENTS

| | | | |
|---|---|---|---|
| 4,804,296 A | 2/1989 | Smath | |
| 4,841,893 A | 6/1989 | Ellison | |
| 5,911,189 A | 6/1999 | Ryan | |
| 6,178,909 B1 | 1/2001 | Palmer | |
| 6,196,150 B1 | 3/2001 | Fondacaro | |
| 6,332,421 B1 | 12/2001 | Leonard et al. | |
| 7,448,338 B2 | 11/2008 | Stewart et al. | |
| 7,775,176 B2 * | 8/2010 | Abel | B63B 59/02 114/364 |
| 8,225,734 B2 | 7/2012 | Huizenga | |
| 9,038,556 B2 | 5/2015 | Ulgen | |

OTHER PUBLICATIONS

Web Article: All-Terrain Roller—Experimenting with fenders, by Christopher Cunninham. Small Boat Monthly. Nov. 2017. All lines and references therein. (See, https://smallboatsmonthly.com/article/all-terrain-roller/).

* cited by examiner

*Primary Examiner* — Lars A Olson
(74) *Attorney, Agent, or Firm* — Prorok Patents

(57) ABSTRACT

In general, embodiments of this invention relate to methods, apparatuses, and systems for providing boat or ship protection from damages associated with vessel contact, allision, or other physical contact or with objects. Therefore a preferred embodiment of the invention is demonstrated as a fender system comprising: a base composed of a vertical back portion of cushioning material; a top foam portion of marine grade material; and a bottom foam portion of marine grade material where the top portion and the bottom portion are connected to the top and bottom of the back portion respectively; the top and bottom foam or marine grade material portion each having a connector to facilitate rotational connection to a fender; and a fender rotationally connected to the top and bottom portion.

19 Claims, 6 Drawing Sheets

METHOD AND APPARATUS FOR A ROTATIONAL FENDER SYSTEM

CROSS-REFERENCE TO RELATED APPLICATIONS

My U.S. Provisional Patent Application No. 63/025,016, filed 14 May 2020, is incorporated herein by reference; and priority to that application is claimed.

REFERENCE TO A "MICROFICHE APPENDIX"

Not Applicable

BACKGROUND OF THE INVENTION

The field of the invention generally relates to the field of boating and, more specifically, to the field of boat protection through the use of fenders.

In general, embodiments of this invention relate to methods, apparatuses, and systems for providing boat or ship or object protection from damages associated with vessel contact, allision, or other physical contact or with objects.

BRIEF SUMMARY OF THE INVENTION

The purpose of this invention is to provide a fast, easy, cheap, and portable method of boat protection between a boat and a dock that especially facilitates the entering and exiting of a dock berth by the boat. A preferred embodiment of the present invention comprises a special fender system that includes one base portion, one rotating fender rotationally connected to the base portion, and a fender whip or attachment means. In the preferred embodiment of the invention, the base portion is stationary but has a portion with rollers or other means of facilitating the rolling of the rotational fender. The system is tied to the boat or dock by at least one fender whip. The system can hang via the fender whip or be placed so that the fender sits partially about the tie point so that if the tie point was a dock cleat, the fender system would be partially above the dock cleat.

In shipping and boating, there are many varieties of vehicles. In this nonprovisional, reference to a boat is meant to include all types of watercraft, water going vehicles, vessels, or vehicles used in shipping or boating or some examples being yachts, superyachts, dinghies, cargo ships, speed boats, fishing boats, ferries, wake boats, amphibious vehicles, and trawlers. There are also docks, and for this nonprovisional, a dock may be anything physical that a boat is tied to. Boats may also be tied to other boats, which will be treated here as a boat and dock. Boats can be tied to multiple docks or even beached. What form of boat and what form of dock are tied together may affect where the points of contact between the two are located.

The present invention provides dynamic protection to a boat and/or a dock as the boat is docking, is docked, and is leaving the dock from the forces that may occur as the boat touches and rubs up on the dock. Such forces may cause the boat to be punctured or cause the boat's structure to lose some significant level of integrity and will at least induce wear over time, resulting in the stripping of paint and some level of wear on the gel coat or surface materials of the boat itself. Relatively static protection, which, although it lowers impact, does not tend to reduce friction wear which is a significant cause of paint, gel coat, or surface material loss. When docked, the boat is typically on the water and exposed to the weather so that the boat's movement is subject to the forces of nature. A boat may be blown by the wind; waves may press the boat up and down against the side of the dock; currents may move the boat, and tides will move the boat as well. The list of forces the boat may be exposed to are many and are not limited to this small list. Such movements cause the boat to rub on the dock and may even place different portions of the boat against the dock over time as they cause the boat to change position or to tilt or rock side to side, for instance. So, a boat will move when tied to a dock, and whatever static thing it rubs against will cause damage to the boat—especially over time. The damage such forces cause may be compounded by salt or other matter that can coat the boat, dock, or anything associated with the sea to increase the damage done from the boat rubbing against anything, including the dock. Further, any rubbing movement may cause loud noises and may affect the quality of life and sleep of those on board a boat or nearby it. Also, any protection itself faces wearing over time, especially if it is a static form of protection where any movement between a boat and a dock grinds on the protection itself. The present invention works to eliminate or reduce wear and noise while providing better protection to boats in a cost-effective and portable manner.

The present invention provides protection that overcomes complexities introduced by the shape of a boat. For instance, some boats have rub rails or guards, as well as spray rails on the lower portion of the hull closer to the waterline. Vessels can often have varying and curving hull shapes that will require different protection against differing heights of a dock at different levels depending on hull shape. These guards on the boat can jut out the side, and some boats have spray rails that go from a point on the bow of the boat and widen outwards as they move toward the stern. These rails and varying shapes add complexities to fully protecting a boat from damage as it sits at a dock that are overcome the present invention.

The present invention protects against the boat structure losing integrity and can also reduce the wear and tear on the boat from general rubbing when taking into account the build and style of the boat. Further, the present invention works to keep the boat close to the dock as reasonably possible which will allow the boat to be easily entered or exited, allow the boat to take up less space, and allow marinas to fit in more mooring spaces. All this occurs while reducing any associated rubbing noise, enabling all boats, especially luxury yachts, to still come close enough to the dock for people, especially those with highly limited mobility or athleticism, to step on the boat without the need of a ramp and then to sleep in silence if so desired. The present invention is also cheap to make and simple for even a single user to use effectively The present invention is also capable of providing protection to a boat in a manner that enables a user to secure a boat when a dock is not available. In these cases, a dry dock, boat ramp, or beach, or other dry portion of land may be used to secure the boat or land a vessel, for instance, to load or unload passengers or supplies in shallow water. The present invention is capable of providing protection to the boat when it is dragged or moved on in contact with land. In the case of boats in remote areas, there are often only a few people around to place the protection should there arise a need to beach the boat, and the present invention allows for a smaller or even single-person crew to provide this protection.

There is a need for a fast, easy, cheap, and portable method of boat protection to protect against impact and rubbing damages. Due to a variety of wind, wave, and weather conditions, this need occurs in positions, attitudes, and spaces that vessel architecture and/or hardware placement of handrails and cleats cannot traditionally accommodate.

DETAILED DESCRIPTION OF THE INVENTION

Figure 1:
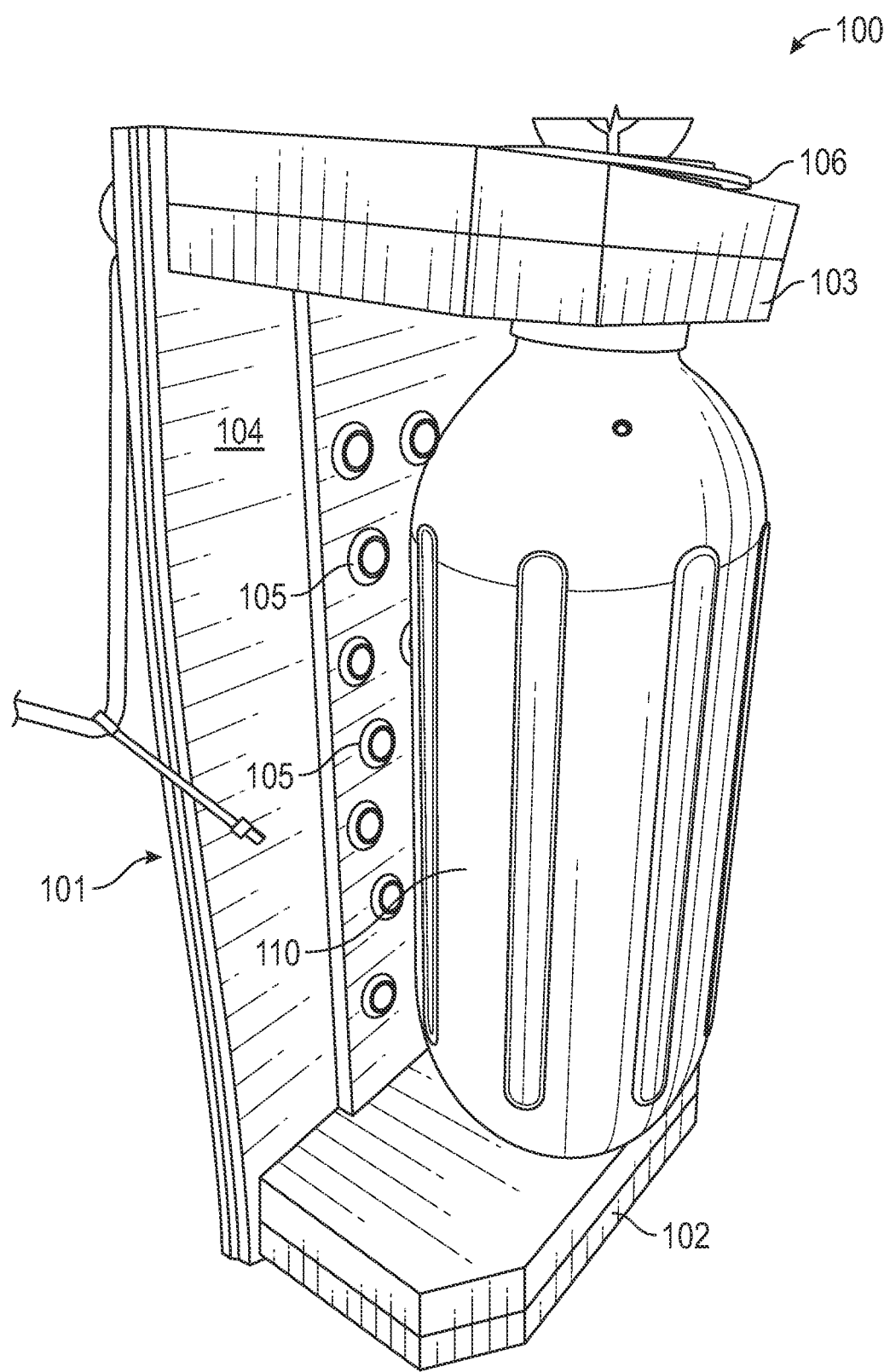
FIG. 1 depicts a perspective view of a fender apparatus with the base portion of the preferred embodiment of the present invention holding a fender.

FIG. 1 shows a preferred embodiment of the present invention. This embodiment of the fender system 100, without fender whips, has a base portion 101 comprising of foam, rubber, or an otherwise cushioning back 104 with embedded marine grade plastic bearing style rollers 105 as well as a bottom portion 102 and top portion 103 in this embodiment each is marine foam piece. The bottom portion 102 and top portion 103 foam pieces each have a connection section 105 for the attachment of the fender 110 to the base portion. A variety of attachment types may be made to facilitate the different hole, eyelet style, or connection mechanisms of the variety of fender types. In the preferred embodiment of the invention, the attachment mechanism will also include at least one eyelet 106 so that the present invention can be tied to a fender whip. In a preferred embodiment, there are at least two eyelets: one on the top portion 103 and on the bottom portion 102. Here only the top eyelet 106 is shown. However, an eyelet may be placed anywhere on the base portion of the present invention. The base portion 101 is sized proportionally to the fender so that it can accept the fender 110 and hold the fender 110 in place. Upgrades may be made to the fender system 100 as multiple layers of materials or components may be used and, the materials will change depending on the demands, for instance, of size scaling, quality, fit, and even the styling of the fender system 100 to match with certain boats such as yachts. When the fender system 100 is hanging by a fender whip, the fender system 100 does not roll out of place or scrape the boat as the base portion 101 rests unmoving against the boat while the fender 110 rotates against the dock to allow the boat to essentially roll along the dock.

The materials making up the base portion 101 will typically be ultraviolet light-resistant marine-grade, rubber, plastic, and foam, or other marine-grade material. However, the fender system 100 can be made from any marine tolerating material or combination of materials. In addition to the variety of tie-down examples in the figures, the invention may also be hung by a fender whip of the boat.

Some embodiments have embedded marine-grade roller styles that include ball caster rollers like bearings; others have rollers that rotate around a center pole. Some embodiments merely provide a lubricated back. Some embodiments do not work to further facilitate the rotation of the fenders. However, when used, the marine-grade rollers should be able to take immense crushing pressure as the boat moves against the dock, and the material type will change as those requirements change due to the size of the boat or the conditions that boat will face. Other means of rollers may be used.

The base portion can be protected by a flat fender behind placed behind it and operationally connected to the base portion so that the flat fender lies against the boat hull, and with the rotational marine fender in front against the dock, so shock and pressure are mitigated while allowing rolling of the fender to occur in most instances.

Figure 2:
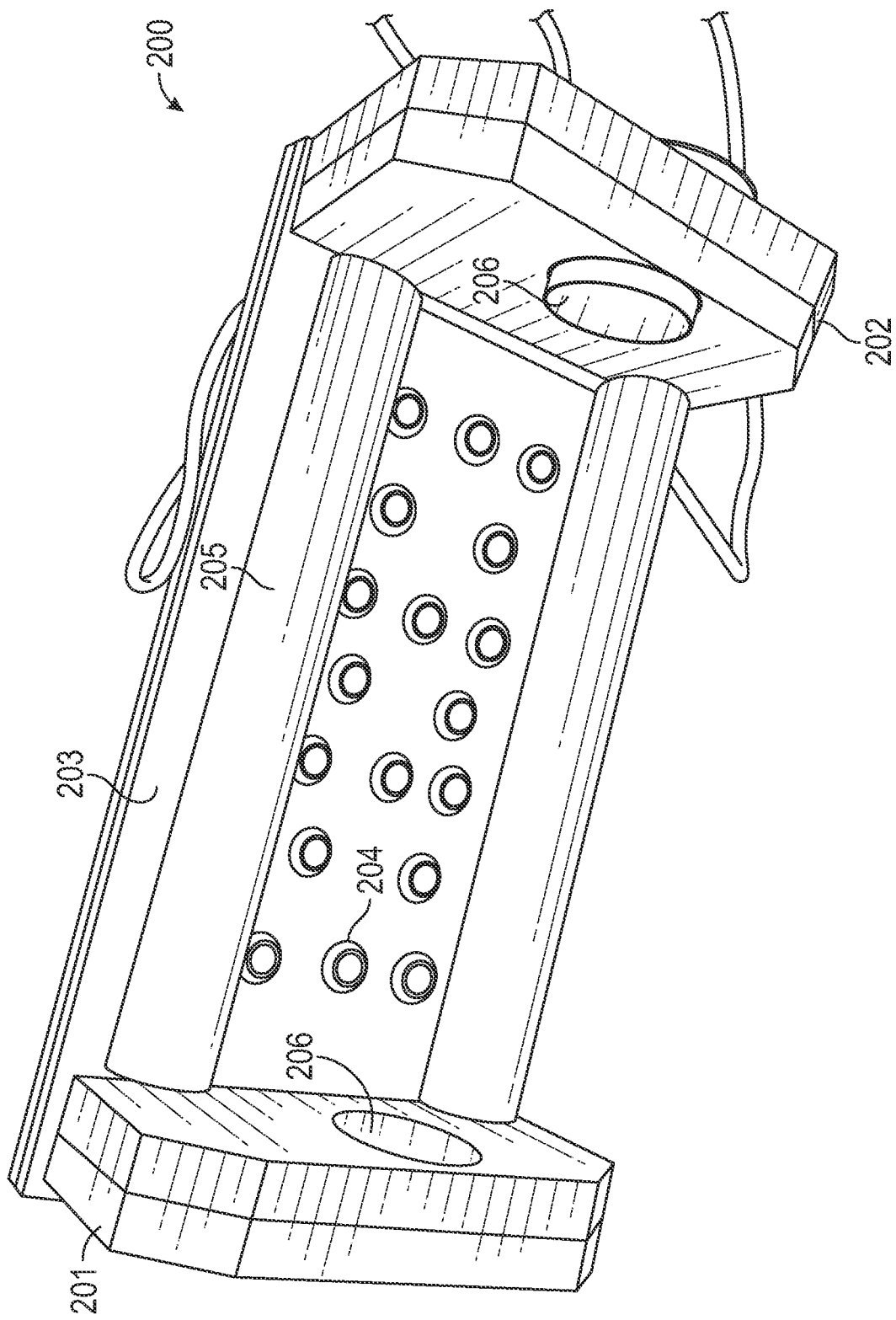
FIG. 2 depicts a perspective view of the base portion of the preferred embodiment with embedded rollers.

FIG. 2 Shows in detail a preferred embodiment of a base portion 200 of the present invention. The base portion 200 consists of a back portion 203 with roller elements 204 embedded into the back portion 203. There is a top portion 202 and a bottom portion 201, both of which will rotationally connect to a fender. The top portion 202 has an eyelet 206 for connecting to a fender whip, as does the bottom portion 201. The back portion 203, as shown in the figure, has side support 205 on each side of the back portion 203 to allow for the fender system to withstand greater forces. However, the back portion 203 need not be supported by side supports or other means. The back portion may also be recessed to help hold the fender in place.

The base portion 200 may consist of low friction material or material suitable for lubrication as well as or instead of the embedded roller elements. The fender may be smaller than the base portion of the fender system—smaller enough so that when operationally connected to the fender, the fender is given some room for vertical travel between the top 204 and bottom 205 portions. The top 202 and bottom 201 portions in most embodiments are not intended to stick out past the edge of the rotational fender but may in some embodiments.

In an alternate embodiment of the invention modified for large fenders, the top portion and bottom portion are recessed to allow the fender to pass the top and bottom portions. In some embodiments, the back portion will consist of rows of padded rollers instead of rollers embedded into the back portion. For instance, the back portion in an alternate embodiment comprises rotational bars connected between a solid top and bottom portion, which operationally connect the back portion to the fender.

In an alternate embodiment of the base portion, the base portion has additional side supports running from the top portion to the bottom portion on the side of the fender. These side supports work to help maintain structural integrity and to assist in holding the fender in place. In some embodiments, these side supports may also role to facilitate the rotation of the rotating fender. The base portion in all embodiments may be either bearings or rollers or other similar means of facilitating the rotation of the fender; in some embodiments, the base portion may not include any rollers or bearing or any means of facilitating rotation; however, the base portion will still be capable of housing a rotating fender.

An alternate embodiment of the invention includes the base portions of two fender systems, connected side by side, so the base portions are even harder to move or flip out of place. Having at least two base fenders helps to keep the fenders from turning over so that the base fender is on the unintended side. Any number of base portions may be connected even by alternate means) so that there are at least two base portions operationally connected to each other, each with their respective rotating fender. The base portion may also be connected vertically to each other to provide a greater area of connection. There is no limit to the number of base portions that may be connected vertically or horizontally.

Figure 3:
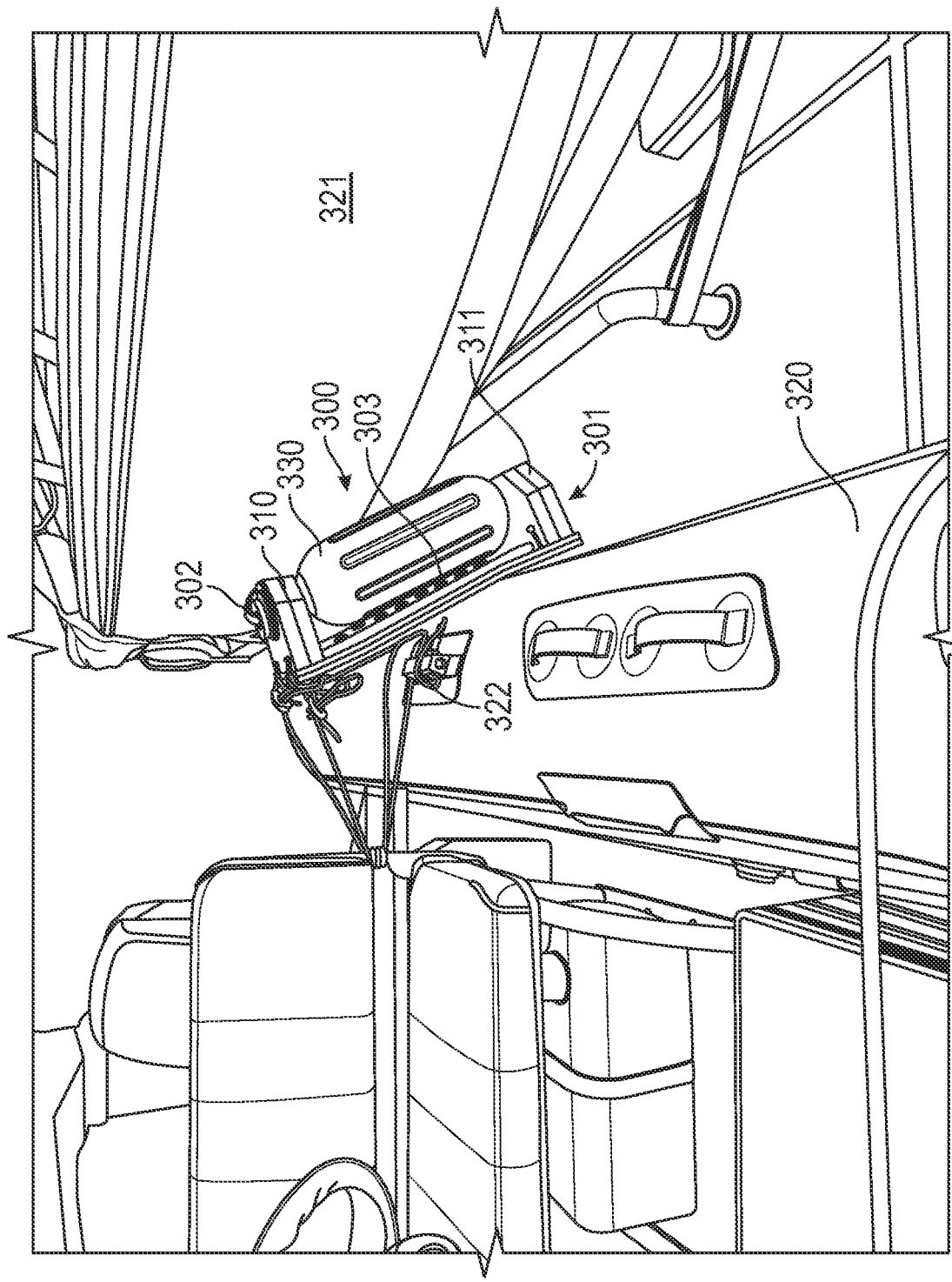
FIG. 3 depicts a perspective view of the preferred embodiment of the present invention tied so as to be raised in part above the cleat tied to it.

FIG. 3 shows a preferred embodiment of the present invention tied to a boat 320 in a manner that, for instance, enables the boat 320 to protect and have protection from a larger dock 321. Here apparatus of the present invention is placed on an inflatable hull tube edge of the smaller boat 320 so that the fender system 300 best protects against contact with a dock that is another larger boat 321. The fender apparatus 300 is elevated so that its upper 50% rises above the cleat 322 of the boat 300. The fender system 400 may be tied the same on a dock or boat.

To achieve this protection, the base portion 301 of the fender system comprises at least one eyelet 302 and at least one fender whip: here, the invention is shown with two eyelets 302 and a first fender whip and a second fender whip. The first fender whip connects to a cleat 322 and the top of portion 310 and the second fender whip ties to the same cleat and to the mid-portion of the base portion 301. The second fender whip supports the fender system 300, while the first fender whip 303 stabilizes the fender system 300. This combination allows the fender to rise above the cleat 322 on the rib of smaller boat 320 and thus protect the area of most contact. The ability to hold the fender system 300 so that it will stay in a variety of configurations is important to ensuring the optimal protective contact that fits a smaller boat to a larger dock. This positioning also works to ensure that rotational axis of the fender 310 is best aligned with the movement of the boat 320. The fender system 300 may sit horizontally or vertically as desired, depending on conditions. The fender system 300 may be permanently or temporarily affixed to a dock or boat in this manner if so desired.

Figure 4:
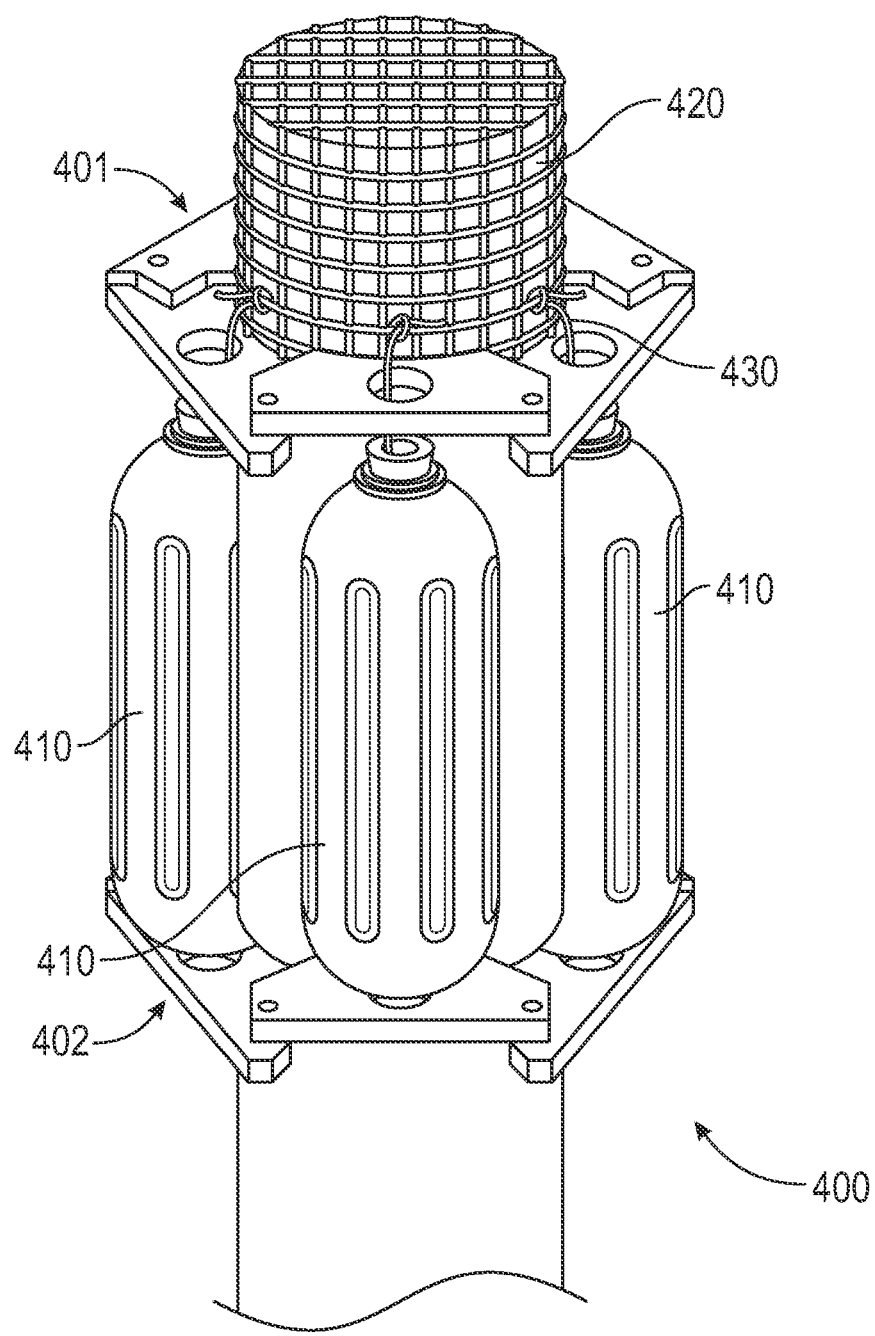
FIG. 4 depicts a perspective view of an alternate embodiment of the present invention enabled to be tied to a piling.

FIG. 4 shows an embodiment of the present invention designed to fit around a cylindrical object such as a dock post 420. This is achieved by the addition of making the top portions of the apparatus into a pivoting crossbar 401 to the fender system 400. This crossbar can pivot at certain distances along its length so that it can bend around the piling 420. Each pivoted portion can receive at least one fender portion 410 of the overall fender system 400. In some embodiments, the inside edge of each top portion of the crossbar 401 is recessed in-between each pivot point in a manner that allows the crossbar portion to fit the curvature of the piling 420. The fender systems may be connected on the top portions 401 or the bottom portion 402 or both as shown. The fender systems themselves may be hung at an angle from the crossbar 401 to ensure that more of the circumference of the piling is has protection (like a barber shop pole). The fender system 400 may be fitted to other objects including but not limited to cylindrical objects. The fender system 400 can hang via a net 430, rope, bungee, or other reasonable methods to the top of the piling. However, the fender system can also hang from the boat but still be placed around the piling as well, in part due to the swivel ability of the fender system (This is beneficial if the top of the piling cannot be reached.) An alternate embodiment of the invention includes clips on the crossbar portion to enable the fenders system to clip onto existing netting or the like. Alternate embodiments of the invention can raise or lower with the tides, but the invention can also be of limited travel, depending on the method used.

Figure 5:
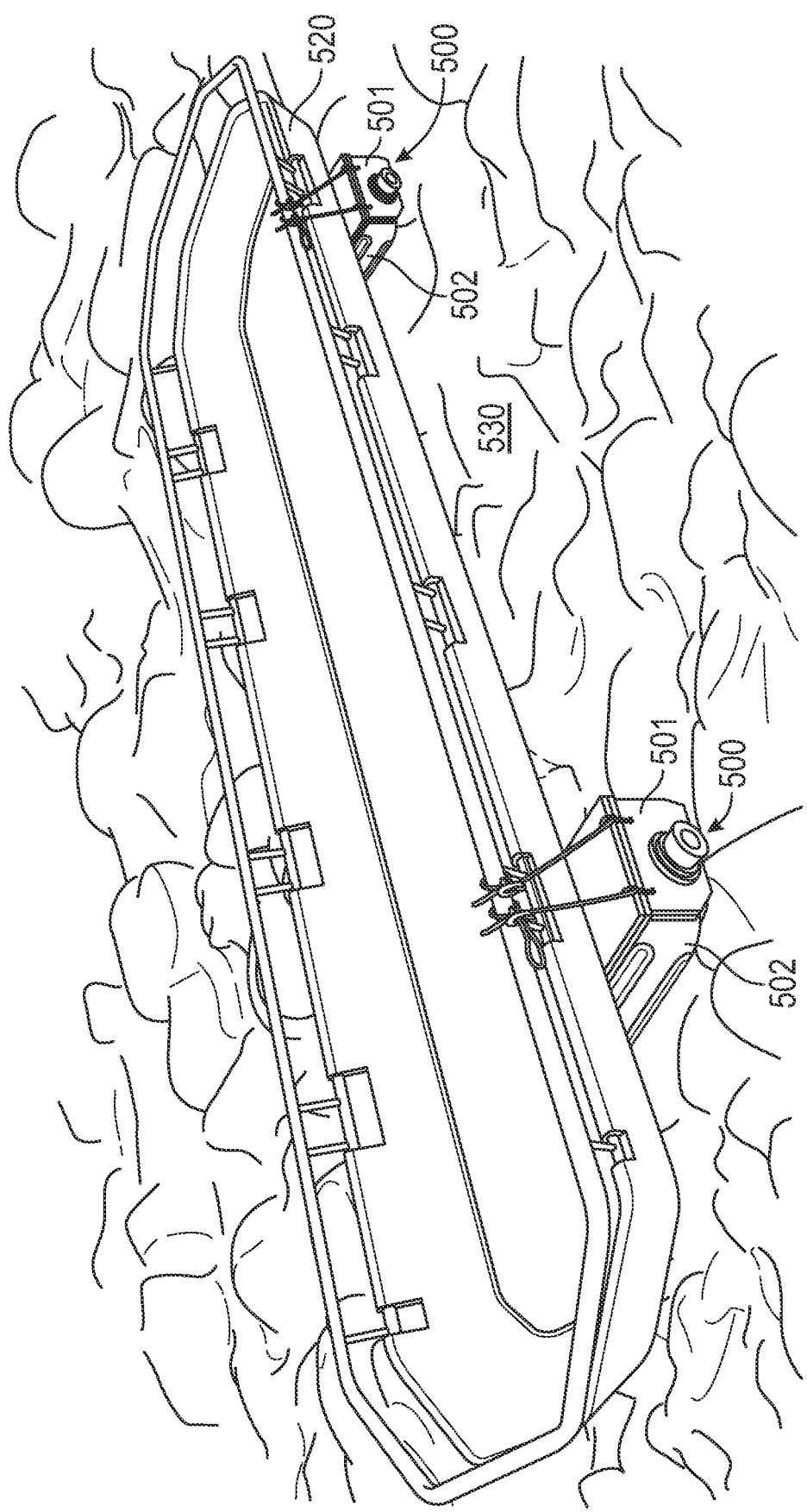
FIG. 5 depicts the preferred embodiment of the present invention connected to a medical basket so as to enable the basket to roll along.

FIG. 5 shows an embodiment of the present invention used as a portable roller device placed underneath a medical stokes basket 520 to enable that stokes basket 520 to be rolled onto a rugged surface 530. The system 500 may be used to transport any reasonable load carrier device. The base portion 501 here connects to stokes basket 520 so that the fenders 502 can rotate. The load-bearing capabilities of the fenders system 500 are not limited to stokes baskets. A preferred embodiment of the present invention may be used as a portable roller to be placed underneath a boat or other heavy piece of equipment during beaching or unloading or at other times when the bottom of the object may otherwise scrape or move against the ground or a surface. Multiple embodiments may be used at once to ensure that the boat or other object can move some distance on a beach. The embodiment of the invention may be used anywhere, including on the boat itself, or in the mountains or desert, even to help transport gear (including, for instance, large, heavy pieces like a spinnaker pole or mainsail boom or trail building supplies.) The fender system 500 can be used in conjunction with a second fender system of the same 500 to allow the beached vessel to continue for a distance with the repeated rotation of fender units under the front end, over and over. This system 500 can be used for occasional heavy parts or gear positioning such as batteries or an engine removal during repower and lifting sailboat booms or poles, etc., which may be too heavy to lift. This system 500 can enable downhill mountain recreational carts—the fenders can take rough terrain. This is also useful when dealing with the stokes basket 520 as with the use of at least one fender system 500; it can take rocky and craggy surfaces—classic rough terrain—and be pulled up without having rescue personnel needing to rappel down and carry the patient up the hill or cliff as they are already protected from bumps on the way up. By using the fender system 500 of the present invention, the fender system gains another capability by providing low cost and easy protection to loads over delicate terrain.

The weight distribution through the fender system is high, meaning a very low pound per square inch is presented to the terrain. Due to high load distribution, the fender system could be adapted to many loads, even on land, such as a heavy load of supplies like wood beams. Since this system is more open than a cart, it enables the transport of irregular shapes, such as a load of 2×4s or a hot tub where one is long and the other shorter but just as bulky—over sensitive or muddy terrain. Sensitive terrains include drainage fields or septic systems that are not amiable to small hard wheels or large, heavy tracks.

As fender system 500 is comprised of fenders in a row connected by at least one crossbar, it is enabled to take on thinner fenders as they work together instead of separately. This low cost, ease of use, adaptability, and portability open the fender system 500 up to even new uses cases such as operating as normal fenders but then operating as load-bearing transport over a surface, for example, when small sailboats are pulled up onto docks. The fender system 500 could protect the sailboat hull from the dock even as it is pulled up and placed on the dock. Because the fender system 500 is a self-contained row of fenders, it is easy for a small crew to handle and thus also optimum for use with remotely operated vessels or unmanned vessels that may only have a small receiving crew. The Fender system 600 is also useful when a boat crew is suddenly trapped by bad weather and only has existing supplies to beach with. The small and lightweight also make this an effective solution for smaller vessels such as rigid inflatable type craft. The terrain need not be solid terrain.

Figure 6:
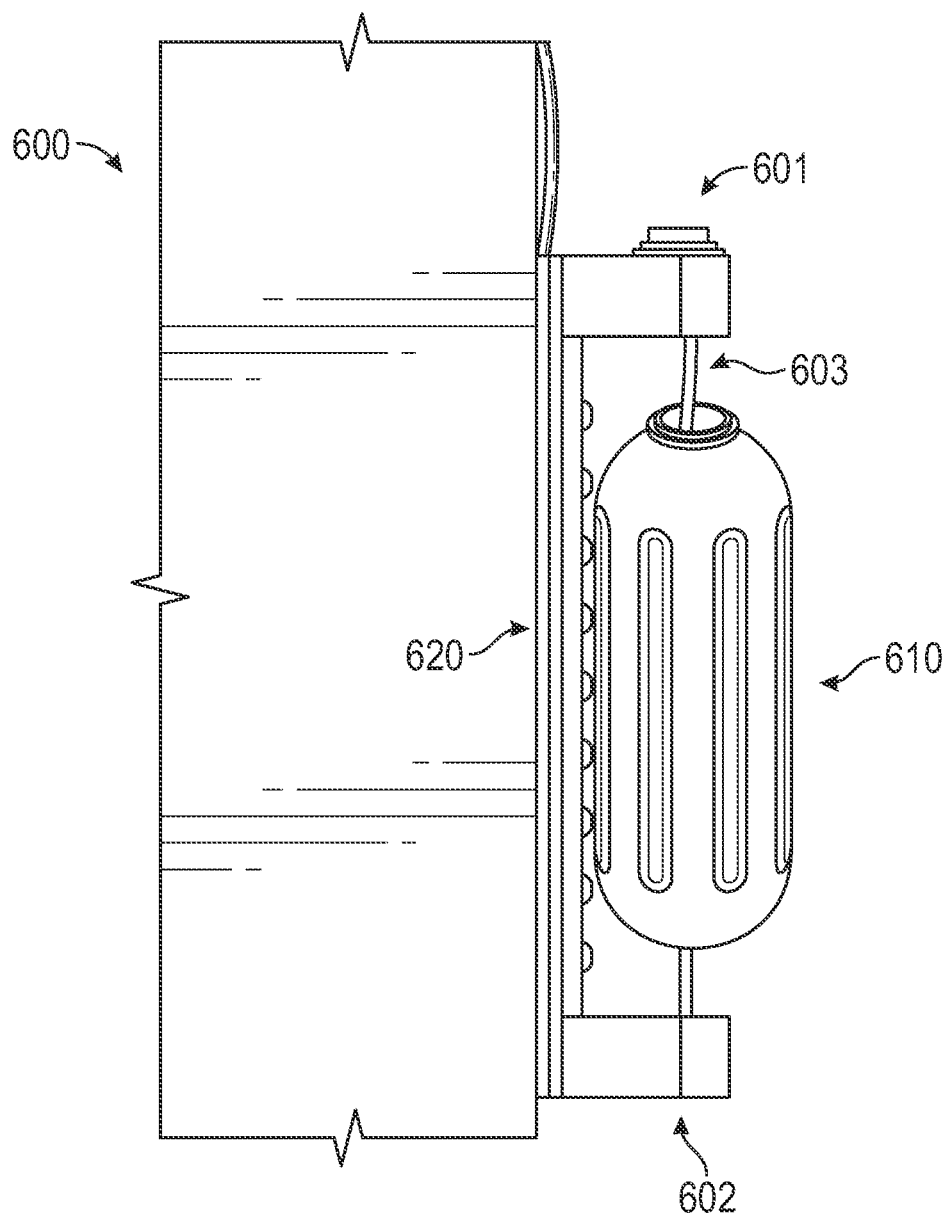
FIG. 6 depicts a perspective view of an alternate embodiment of the present invention where there is vertical travel for the fender.

FIG. 6 shows an embodiment of the present invention where the fender 610 of the fender system 600 has vertical travel. A Fender whip 603 connects to the top portion 601 and the bottom portion 602 and is threaded through a center hole fender 610. The base portion 620 is here connected to a solid object, however, the fender system may also be hung in this configuration.

In a simple, alternate embodiment of the present invention the base portion 620 of the fender system 600 is no more. The cord 603 would be operationally attached to an upper loop on a fender whip and a lower loop on the fender whip. The loop goes through the center hole of the fender and attaches to the fender whip so that the fender rotationally hangs to the fender whip by the loop. Thus, the fender 610 is attached directly to the fender whip.

There does not need to be rollers or any base portion in this embodiment, however, in an alternate embodiment bead like rollers could be placed on the fender whip between the first loop and the second loop to facilitate rolling. Alternatively, in some embodiments a base portion with rollers hangs from the loop itself. In an alternate embodiment the top and bottom portions can be added back onto the looped cord by running the looped cord through them.

In a second simple embodiment of the present invention, the top and bottom portions include a loop of cord in addition to the normal platform. The fender system can then utilize clips to connect onto a looped fender whip.

In another alternate embodiment of the present invention the top portion and bottom portion are each comprised of at least one looped cord. A straight cord attaches to each of the top and bottom portions by, for example, being clipped on or tied. The straight cord holds a center hole fender between the top and bottom portion by being threaded through the center hole fender.

These looped embodiments of the invention allow for quick clip-ons to connect the fender apparatus to the fender whip. But all embodiments may incorporate a fender whip clip or eyelet.

In general, of the present invention of this application: The base portion can be made to scale with fender size. Fenders may be designed solely to better fit this system. The invention can be freely hung from a boat or dock or permanently attached to one or the other. The fender system may be raised partially above dock level and off-center from a cleat. The drawings and figures show multiple embodiments and are intended to be descriptive of particular embodiments but not limited with regards to the scope or number, or style of the embodiments of the invention. All portions of the present invention may be sized to incorporate branding. Although directional terminology is used, the invention may be operated upside down, perpendicular, or at any other angle to the directions mentioned. The boat and dock combo has been picked to help with visualization of the invention and to show the best mode of the invention; however, more generally, the present invention can protect a first object from a second object. A cleat can in any case, unless explicitly said otherwise, be read as any other suitable tie-down area for a fender whip.

Of this application, nothing should be construed as critical or essential unless explicitly described as such. Also, the articles "a" and "an" may be understood as "one or more." Where only one item is intended, the term "one" or other very similar language is used. Also, the terms "has," "have," "having," or the like are intended to be open-ended terms. Features of different embodiments may be combined. The fenders systems of the present invention, although labeled 100, 200, 300, 400, 500, and 600, have been labeled with different numbers only to help identify the figure they are on and not to identify different embodiments (although they may be different embodiments at times). The purpose of this specification is to provide a well out of which to draw and support intended claims—including those as not yet written and/or submitted.

I claim:

1. A fender apparatus comprising:
   a. A base portion comprising,
      i. A back portion,
      ii. A top portion and a bottom portion each operationally connected to the top and bottom of the back portion respectively, and
      iii. The top portion and the bottom portion are capable of rotationally attaching to a fender placed in-between the top portion and the bottom portion;
   b. A fender rotationally connected to the top portion and bottom portion;
   c. At least one eyelet operably connected to the base portion capable of receiving a fender whip; and
   d. At least one fender whip or net operably attached to the eyelet and bearing the weight of the base portion.

2. The fender apparatus of claim 1 wherein the base portion further comprises a clip on the eyelet capable of connecting the base portion to a net or a loop of a fender whip and the net or the fender whip now operably connects to the base portion through the clip.

3. The fender apparatus of claim 1, wherein the base portion is comprised of a series of loops, the back portion being a fender whip, the top portion being a loop on the fender whip, and the bottom portion being a second loop on the fender whip, and the fender being a center hole fender rotationally connected to the top portion and the bottom portion by a rope through the center hole of the fender which operationally connects to the top portion and bottom portion loops.

4. The fender apparatus of claim 1, further comprising a second equivalent base portion operationally connected to the first base portion to sit beside the first base portion.

5. The fender apparatus of claim 4 further comprising multiple sets of base portions operationally connected to a fender of their own, where the base portions are operational connected in a row and are enabled to swivel.

6. The apparatus of claim 1, further comprising the fender whip connecting the base portion of the fender to a boat so that the back portion is against the boat and the fender is against the dock.

7. The fender apparatus of claim 6, further comprising two of the fender whips, a first fender whip and a second fender whip, where the first fender whip is connected to a cleat on a dock or boat and an eyelet on the top of the base portion and the second fender whip is connected to the same cleat as the first fender whip and a second eyelet on the bottom of the base portion wherein the fender ropes are tightened enough to raise the fender apparatus above the height of the cleat.

8. The fender apparatus of claim 1, further comprising the flat back portion having a set of rollers to facilitate the rolling of the fender rotationally connected to the top portion and the bottom portion.

9. The fender apparatus of claim 8, wherein the apparatus is operationally connected to the underside of a load carrier device in a manner enabling the fender to provide protection to the load carrier device from solid objects underneath and enable the load carrier device to roll over surfaces.

10. The fender apparatus of claim 8, wherein the rollers are marine grade plastic bearings rotationally set into the back portion of the base portion.

11. A method of protecting against allusion damage comprising;
   a. Gaining a fender apparatus comprising a base portion comprising,
      i. A flat back portion,
      ii. A top portion and a bottom portion each operationally connected to the top and bottom of the flat back portion respectively, and
      iii. An eyelet operably connected to the top portion and capable of receiving a fender whip,
      iv. The top portion and the bottom portion are capable of rotationally attaching to a fender placed in-between the top portion and the bottom portion; and
   b. Placing the fender apparatus between a first object and a second object by hanging the fender apparatus.

12. The method of claim 11 wherein the first object is a medical basket, and the second object is a surface.

13. The method of claim 11 wherein the first object is a boat, and the second object is a dock.

14. The method of claim 13 wherein the fender apparatus, is hung between the boat and the dock by tying the fender apparatus to the boat via a fender whip, and then moving the boat into the docked position in a manner that allows the fender apparatus to end up operationally placed between the boat and the dock.

15. The method of claim 11 further comprising at least one additional eyelet connected to the base portion, each of the eyelets are operationally connected to a fender whip, and each fender whip is connected to a different tie-down area to best position the fender apparatus.

16. The method of claim 11 wherein, the fender apparatus is operationally attached to at least one fender whip, which attaches to a cleat and to the fender apparatus via an eyelet on the bottom portion of the fender apparatus and an eyelet on the top portion in a manner so that the slack in the fender whip is taken up and the fender apparatus sits partially above the cleat.

17. The method of claim 11 wherein the fender is placed between the first object and the second object by means of attaching a fender whip to the eyelet and attaching the fender whip to a dock post.

18. The method of claim 17 wherein, there are at least two of the fender apparatus, and the fender apparatus are connected side by side in a manner that allows for them to swivel to fit the curvature of the dock post.

19. The method of claim 18 wherein the fender system is permanently affixed to the first or second object so that whenever the first or second object approaches the other object the fender apparatus operationally receives them.

\* \* \* \* \*